United States Patent [19]
Llewelyn et al.

[11] 4,011,068
[45] * Mar. 8, 1977

[54] PARTICLE SEPARATOR

[75] Inventors: Richard Penderell Llewelyn, Cheltenham, Australia; John Austin Hart, Lymm, England

[73] Assignee: State Electricity Commission of Victoria Commonwealth of Australia, Melbourne, Australia

[ * ] Notice: The portion of the term of this patent subsequent to May 3, 1992, has been disclaimed.

[22] Filed: Feb. 28, 1975

[21] Appl. No.: 553,973

Related U.S. Application Data

[63] Continuation-in-part of Ser. No. 314,165, Dec. 11, 1972, Pat. No. 3,883,332.

[52] U.S. Cl. .......................... 55/459 D; 110/101 R
[51] Int. Cl.² ....................................... B01D 45/12
[58] Field of Search ......... 55/459 D, 338, 391–399; 110/101

[56] References Cited
UNITED STATES PATENTS 3,883,332  5/1975  Llewelyn et al. .................... 55/459

*Primary Examiner*—Bernard Nozick

[57] ABSTRACT

Apparatus for separating particles from a stream of gas and entrained particles comprising an annular duct having at one end an inlet to direct the stream into the duct such that the stream passes through the duct with swirl and at the other end outlet means to divide the inner part of the flow from particles in the outer region of the flow. The inlet and duct are shaped so that the swirl within the duct is that of a potential vortex in which the velocity is perpendicular to the axis of the vortex and is inversely proportional to the radius from this axis. This enables substantially streamline flow to be maintained. The annular duct may be conically tapered.

8 Claims, 8 Drawing Figures

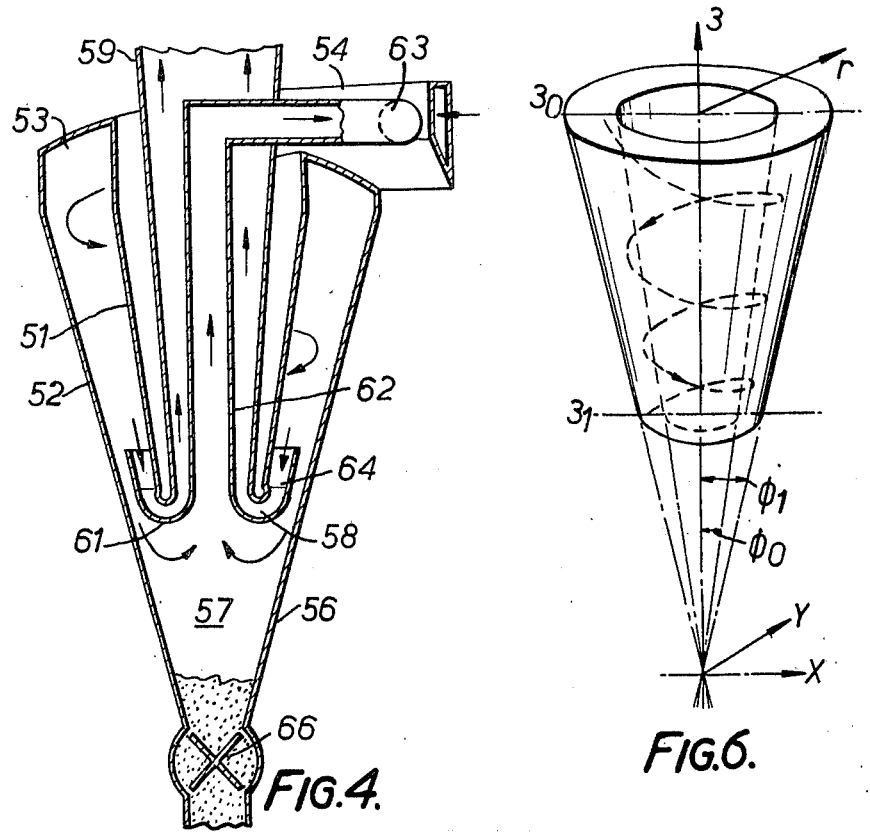
Fig.4.
Fig.6.
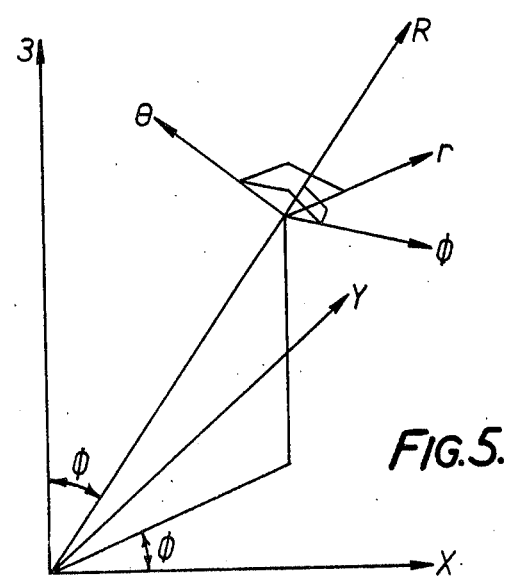
Fig.5.

PARTICLE SEPARATOR

CROSS REFERENCE TO RELATED APPLICATION

This is a continuation-in-part of application Ser. No. 314,165 filed Dec. 11, 1972 now U.S. Pat. No. 3,883,332 issued May 13, 1975.

BACKGROUND OF THE INVENTION

1. Field of the Invention

This invention relates to the separation of particles from a stream of gas and entrained particles. As used herein, the term "particles concentration" signifies a measure of the quantity of particulate material to the quantity of gas in the stream of a part thereof on a weight or volume basis and not of the actual number of particles in the stream. Thus, a stream which has a high particle concentration is rich in particulate material and lean in gas whereas a stream of low particle concentration is relatively rich in gas and lean in particulate material.

2. Description of Prior Art

One application of the invention is to the burner pipes of brown coal burning boilers. In such boilers, the brown coal is pulverised in a mill and is carried by a stream of hot gas to the burners, the mill providing the active mixing needed for drying. The stream of gas and pulverised fuel is usually passed through a classifier before being supplied to the burner so that oversize fuel is returned to the mill for further treatment. With the high moisture content of the brown coal, large quantities of water vapour are generated which tend to quench the flame. This problem can be overcome by causing a partial segregation of the pulverised fuel from the accompanying gas and water vapour to form separate sub-streams of differing particle concentration, these sub-streams being supplied to separate parts of the furnace to improve the combustion and heat transfer therein.

Conventionally the required partial segregation for separation firing is obtained in a tubular concentrator fitted with radial vanes which superimpose on the flow a swirling motion. Such a concentrator creates large pressure losses in the system and substantial extra power is required to overcome these losses. Moreover the turbulence associated with the swirl tends to oppose the inertial separation of the coal particles.

By the present invention it is possible to create three-dimensional swirling flow which is also a substantially streamline or irrotational flow. Such a flow can provide efficient separation of particles without turbulent remixing and with much lower power losses than with conventional cyclone separators.

There have been previous attempts to achieve three-dimensional swirling flow without the turbulence and diffusion associated with conventional cyclone separators. U.S. Pat. No. 2,385,745 of Vogt discloses one construction which attempts to achieve such flow. In this construction there is an annular chamber and a cover which starts at the top of the inlet and spirals downwardly through 360° and it is stated that the resultant downward deflection of gases causes "contiguous convolutions of uniform cross-section without either radial or axial displacement by incoming air." However, the mere provision of a guide surface along a particular desired flow path does not ensure that a real fluid will follow that path. In fact a real flow will only be fully guided by imposed boundaries if the pressure gradients implied by the shape of the guiding boundaries can be sustained in real fluids. Therefore to achieve a substantially streamline flow the shapes of the surfaces confining the flow must be carefully designed to conform with a real flow without unsustainable pressure gradients and all of the surfaces must be compatible with the desired real flow. Specifically, in order to transform a uniform duct flow into a swirling non-turbulent flow it is necessary to provide a carefully designed inlet which will provide a transitional flow consistent with the duct flow and the swirling flow. Leading a uniform duct flow directly into an annular flow as shown in FIG. 2 of the Vogt specification will either result in acceleration of the fluid approaching the centrebody (3) surface — which is then inconsistent with the flat radial profile of the helical cover — or, to be consistent, in a vortical, and therefore turbulent flow with a constant swirl component. The practical result will probably be a combination of these two comprising a near inviscid region and an outer vortical region stemming from the flow separating from that wall. The three-dimensional interaction with the incompletely compatible roof would produce further complications resulting in turbulence.

U.S. Pat. No. 2,378,600 (Van Tongeren) and U.S. Pat. No. 3,060,664 (Morawski) both show cyclone separators in which there is provided means intended to impart a helical pattern of rotation in the vicinity of the inlet in such a way as to reduce interference and turbulence at the inlet scroll. However, in these constructions, too, there is no analysis of the flow to be achieved and no attempt to provide an inlet which can provide the necessary transition between a straight duct flow and a swirling flow while maintaining a realisable flow of a real fluid and without unsustainable pressure gradients.

The present invention involves matching of a carefully shaped inlet with an annular duct to conform with a realisable flow involving a transition from a straight duct flow to a swirling irrotational annular flow. Analysis of the flow concerned will be detailed below and it will be seen that it results in an inlet of unique shape which is quite distinct from the inlets of the prior art constructions.

SUMMARY OF THE INVENTION

The irrotational flow on which the present invention is predicated is the potential vortex in which the velocity is perpendicular to the straight axis of the vortex and is, inversely proportional to the radius from this axis, the constant of proportionality being the vortex strength. There must also be transmission of the flow parallel to the vortex axis. The degree to which the real flow will correspond to the theoretical potential vortex will depend on the extent to which the flow is influenced by boundaries. The rate of growth of wall boundary layers can be reduced by accelerating the flow along these boundaries.

The invention provides an apparatus which achieves transition from a straight duct flow to a potential vortex flow established within an annular duct incorporated in the apparatus. The annular duct has outer and inner tubular walls both extending from an inlet end of the duct through to an outlet end of the duct. The inlet end of the duct is provided with an annular roof and also with an inlet which directs the flow into the inlet end of the duct so that it flows with swirling motion through to the outlet end of the duct and which is shaped to conform with the necessary transitional flow.

The inlet has a roof, a floor and inner and outer walls connecting the roof and floor so as to define a single inlet passage separate from the annular duct.

The preferred design of the inlet is characterized by the following features:

1. For all transverse cross-sections through the inlet taken radially of the duct the inner and outer walls of the inlet are substantially parallel with an axis of the duct, the outer wall is longer than the inner wall in the direction parallel to the duct axis so that the roof and floor of the duct are mutually inclined and the floor of the duct is less transverse to the duct axis than the roof of the duct.

2. The roof of the inlet smoothly joins the roof of the duct.

3. The floor of the inlet and the smoothly continuous inlet and duct roofs become continuously less transverse to the axis of the duct in the direction of flow.

4. The roof of the duct, after one revolution of the duct, joins smoothly with the floor of the inlet at the entrance to the duct.

5. The inner and outer walls of the inlet converge and the inlet is of contracting cross-section in the direction of flow.

Specific equations establishing the exact configuration of the inlet are provided below.

In order that the invention may be more fully explained, some specific separators and mathematical methods by which components of those separators can be designed will now be described with reference to the accompanying drawings.

BRIEF DESCRIPTION OF THE DRAWINGS

FIG. 4 is a diagrammatic longitudinal cross-section through a conical vortex separator used as a particle collector for gas cleaning purposes;

FIG. 5 shows the axes of Cartesian, cylindrical polar and spherical polar coordinate systems used in the mathematical design methods to be described;

FIG. 6 is a conceptual sketch of the flow in a conical vortex separator also to be referred to in the description of the mathematical design methods;

DESCRIPTION OF THE PREFERRED EMBODIMENTS

Figures 1, 2:
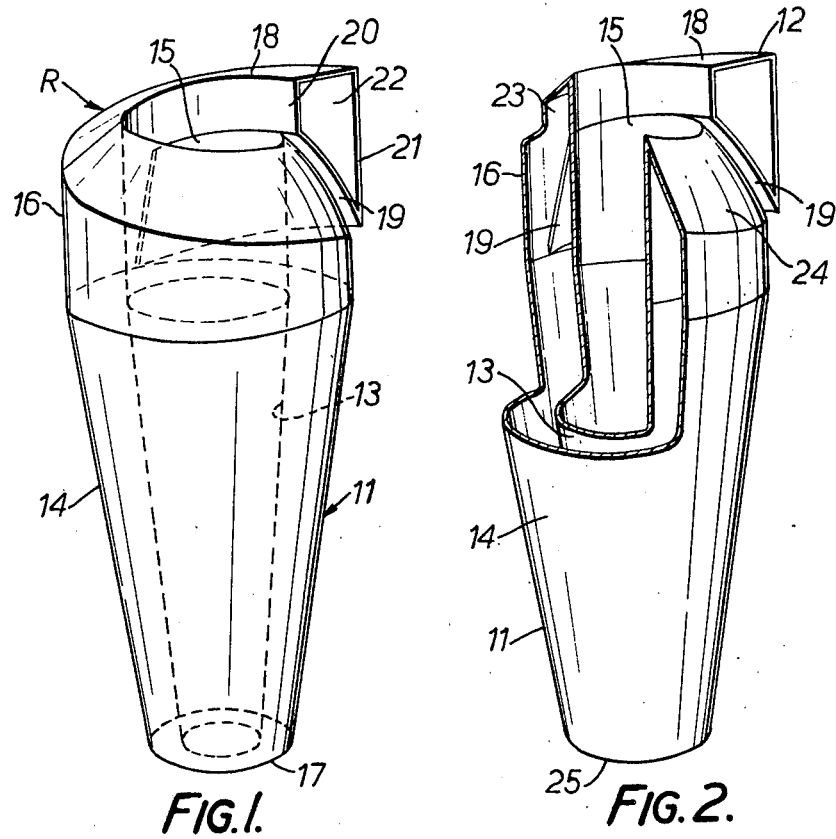
FIG. 1 is a perspective view of a conical vortex separator constructed in accordance with the invention.
FIG. 2 is a partly sectional view of the vortex separator shown in FIG. 1.

FIG. 1 shows a conical vortex separator comprised of an annular duct 11 and a curved contracting inlet 12. Annular duct 11 has main conically tapered inner and outer wall portions 13, 14 and upper cylindrically curved inner and outer wall portions 15, 16 which extend to the inlet. The conically tapered wall portions 13, 14 converge toward a common origin disposed on the central axis of the duct beyond the outlet end 17 of the duct.

Inlet 12 has a roof 18, a floor 19, inner wall 20 and an outer wall 21 so as to define a single inlet passage 22 which is separate from the annular duct. The inlet passage 22 joins the interior of the annular duct at the position indicated by the numeral 23 in FIG. 2. At this position inner and outer walls 20, 21 of the inlet smoothly join the cylindrically curved inner and outer wall portions 15, 16 of the duct and the roof 18 of the inlet smoothly joins an annular roof 24 on the inlet end of duct 11. Roof 24 extends around the inlet end of the annular duct for one revolution and it becomes progressively less transverse to the axis of the annular duct, i.e. in the position shown it becomes more and more upright until at the inlet section 23 it joins smoothly with the floor 19 of the inlet 12. The inner and outer walls 20, 21 of the inlet converge in the direction toward the entrance to the annular duct at position 23 and the inlet as a whole is of contracting cross-section in the direction of flow.

From FIGS. 1 and 2 and the above description it will be seen that inlet 12 is characterized by the following features:

1. For all transverse cross-sections through the inlet taken radially of the duct the inner and outer walls 20, 21 of the inlet are substantially parallel with the axis of the duct (i.e. vertical in the position illustrated), the outer wall 21 is longer than the inner wall 20 in the direction parallel to the duct axis (i.e. the vertical direction) so that the roof 18 and floor 19 of the inlet are mutually inclined and the floor 19 is less transverse to the duct axis, (i.e. less horizontal and more upright) than the roof 18. The resulting shape of the duct is generally trapezoidal although floor 19 is slightly curved.

2. The inner wall 20 and outer wall 21 of the inlet converge in the direction of flow and smoothly join the inner and outer walls of annular duct 11 respectively.

3. The roof 18 of the inlet joins smoothly onto the roof 24 of the duct.

4. The floor 19 of the inlet and the smoothly continuous inlet roof 18 and duct roof 24 become continuously less transverse to the axis of the duct (i.e. more upright) in the direction of flow.

5. The roof 24 of the duct, after one revolution around the duct, joins smoothly with the floor 19 of the inlet at the entrance to the duct.

Although for convenience of description the terms "roof" and "floor" have been used in the above description it is to be understood that such terminology does not imply that the separator can only be operated in the upright position as illustrated in FIGS. 1 and 2. As will be apparent from the embodiment illustrated in FIG. 3 separators according to the invention can be operated in other dispositions.

In use of the separator a stream of gas and entrained particles is passed into inlet 12 whence it is converted from a uniform streamline flow into a swirling flow having swirl about the axis of the annular duct 11. The swirling flow passes along the duct to the end 17 and gas is drawn from an annulus comprising the inner part of the exit annulus of the flow at the duct end 17. In this manner there is generated a flow which conforms to that defined by a point three-dimensional potential sink lying on the axis of a potential vortex, the sink being located at the apices of the cones which constitute the stream surfaces of such a flow. More particularly the entry of the stream from the inlet 12 into the duct 11 is directed relative to the sink such that there is established within the duct 11 a substantially potential sink-vortex flow having bounding streamlines which lie on the surfaces of cones converging to the same origin as the conical walls 13, 14. Thus the walls 13, 14 conform to the conical stream surfaces of the potential sink-vortex flow and can serve as inner and outer physical boundaries with very little generation of turbulence. The flow speed on these boundaries will increase in the direction of motion of the gas producing favourable conditions for the wall boundary layers.

In the vortex flow within duct 11 the highest velocities occur where the particle concentration is least and vice versa. This is clearly favourable from the point of view of wear on the walls 13, 14. Turbulence will of course be present to some degree but it is known that turbulent mixing is enfeebled at convex surfaces and strengthened at concave surfaces. These results are favourable for the swirl separator since the tendency to oppose separation will be minimized in the inner flow and is of little consequence in the outer flow where in any case the high concentration of particles will tend to damp turbulent motion.

The shape of contracting inlet 12 is such as to produce at the inlet to the annular duct a radial distribution of circumferential velocity conforming to the potential vortex within the duct, a radial distribution of axial and radial velocity conforming to the flow component producing movement along the axis and having a cross-sectional shape such that the flow adjacent the roof of the inlet will, after one revolution in the duct, exactly coincide with the flow emerging from the inlet adjacent the floor of the inlet and have a matching velocity distribution so that the flows join smoothly. Thus after passing through the position indicated by numeral 23 in FIG. 2 into the annular duct the flow can continue with its sink-vortex swirling flow without the need for any physical dividers within the annular duct.

The mathematical methods whereby the annular duct 11 and contracting inlet 12 can be designed will be explained hereafter.

Separators of the types shown in FIGS. 1 and 2 could simply replace the more conventional separators presently used in particle separation firing of boiler installations. Alternatively, in order to use the angular motion of the fuel rich stream, the separator could be attached directly to the furnace wall and the fuel stream discharged as from a swirl burner. This could be done while still obtaining the full benefit of complete separation by returning the fuel-lean vapour stream inside the inner cone of the separator.

Figure 3:
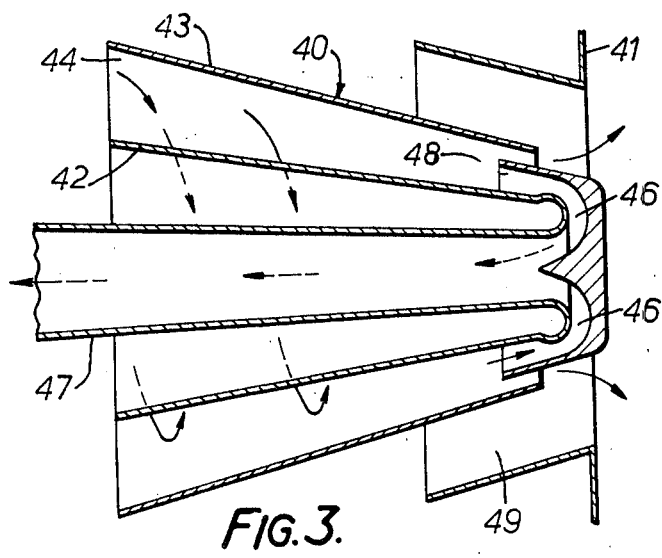
FIG. 3 is a diagrammatic longitudinal cross-section through a conical vortex separator incorporated in a burner for a furnace.

An exemplary combination separator and burner is shown in FIG. 3. The combination burner and separator 40 is mounted in the furnace wall 41. The inner and outer conically tapered walls of the separator are designated as 42, 43 and the fuel and vapour stream enters the end 44 of the duct between these walls from a contracting inlet (not shown).

The burner end of the combination has a refractory nose 45 which is shaped to provide a return passage 46 through which fuel-lean vapour is drawn from the inner region of the swirling flow in the separator duct and to waste through a central tube 47. Straightening vanes 48 are provided at the entrance to the return passage 46 to give pressure recovery of the swirl energy present in the waste vapour. Since the waste gases come from the most energetic part of the flow within the separator (i.e. adjacent the inner wall) such pressure recovery is quite important.

The particle enriched portion of the stream at the other wall of the separator passes from the separator with swirling motion and is mixed with secondary air from a secondary air manifold 49 as it discharges directly into the furnace for combustion.

Separators according to the invention may also be used for gas cleaning purposes and FIG. 4 illustrates a separator 50 for separating and collecting particles from a gas stream. The inner and outer conically tapered walls of the separator are designated as 51 and 52 and the particle laden gas stream enters the inlet end 53 of the duct from a contracting inlet 54. In this case a conical extension 56 of the outer wall 52 of the annular duct is provided so as to define a particle collection chamber 57 beyond the annular duct outlet.

Particle lean gas is drawn from the inner part of the swirling flow at the duct outlet via an annular inlet 58 to a gas outlet pipe 59 extending back through the interior of the annular duct. The wall portion 61 defining the central aperture through annular inlet 58 is connected to a further pipe 62 extending back through the interior of the pipe 59 so that gas may be drawn from chamber 57 through this pipe 62. Adjacent the inlet end of the annular duct pipe 62 passes out through the wall of pipe 59 and connects with inlet 54 at 63. Gas flowing into the annular duct via inlet 54 causes a pressure reduction in pipe 62 so that gas is drawn from chamber 57 back through pipe 62 and into inlet 54 so as to be recycled through the annular duct. Inlet 58 is fitted with flow straightening vanes 64 to give pressure recovery of the swirl energy present in the gas entering outlet pipe 59.

Particles in the outer regions of the swirling flow within the annular duct pass from the duct outlet into chamber 56. They settle in the bottom end of the chamber which serves as a collection hopper and are removed by intermittent or slow continuous rotation of an eliminator valve 66.

Separators of the type illustrated in FIG. 4 may find wide use in gas collecting applications. They could be used in place of electro-static separators or as pre-cleaners in advance of electro-static cleaners.

DESCRIPTION OF MATHEMATICAL DESIGN METHODS

1. Introduction

The general problem of three-dimensional particle motion is, of course, highly complex; however, it is possible to derive approximate analytical expressions for the trajectories of very small particles in simple swirling flows. Provided that the smallest particles of interest are indeed very small in this context, and that the simple flow postulated can be approximated in practice, the solutions obtained in this way can be applied to the design of devices in which these, and all larger particles, are separated from a portion of the gas.

2. Nomenclature

Symbols used in one section only are defined as they occur and are not listed here.

A bar over a symbol denotes a vector quantity.

c numeral constant

C $\sigma d^2/18\mu$ (units of time)

d particle diameter (diameter of sphere of equal volume)

g gravitational acceleration

K vortex strength (circulation/$2\pi$)

M sink strength (volume flow per unit time/$4\pi$)

P fluid pressure $q$ particle speed
$q_F$ fluid speed
$Q$ rate of flow of fluid volume through the separator
$r$ distance from z-axis in x, y plane
$R$ distance from origin
$Re$ particle Reynolds number $d|\bar{q}_F - \bar{q}|/\nu$
$S$ separation, fractional volume flow clear of particles
$t$ time
$v_e$ mean swirl velocity component at separator exit
$v_o$ swirl velocity component on inner cone at separator exit $w_e$ mean axial velocity at separator exit $z_0, z_1$ $z$ co-ordinates of separator entry and exit planes

| x, y, z axes of Cartesian co-ordinate system | See Figure 6 |
|---|---|
| z, r, $\theta$ axes of cylindrical polar co-ordinate system | |

R, $\phi$, $\theta$ axes of spherical polar co-ordinate system)
See FIG. 6
$\phi_0, \phi_1$ semi-angles of inner and outer separator cones
$\rho$ fluid density
$\sigma$ particle density
$\mu$ fluid viscosity
$\nu$ kinematic fluid viscosity $\mu/\rho$
$\nabla$ vector differential operator 3. Equation of particle motion The inertia of dense particles carried by a gas flow causes them to diverge from curved fluid streamlines. The centripetal force arising from the pressure gradient in an irrotational flow is sufficient to produce the required lateral acceleration of an element of gas, but not of a denser solid particle, which therefore pursues a straighter path and thus acquires a velocity relative to the gas. The particle is then subjected to gravitational, pressure gradient and drag forces. The resultant of these forces can, by Newton's second law, be equated to the product of the mass and acceleration of the particle, and the equation of motion integrated within a prescribed flow field to determine the particle trajectory.

The equation of motion for a single spherical particle whose position vector is $\bar{r}$ is $$\sigma \frac{\pi}{6} d^3 \frac{d^2 \bar{r}}{dt^2} = C_D \frac{\pi}{4} d^2 \frac{\rho}{2} |\overline{q_F - q}|(\overline{q_F - q}) + \bar{g} \frac{\pi}{6} d^3 (\sigma - \rho) + \frac{\pi}{6} d^3 \nabla p \quad (1)$$

Putting $C_D$ = particle drag coefficient = $\frac{f(Re)}{Re}$ $Re$ = particle Reynolds number = $\frac{d|\overline{q_F - q}|}{\nu}$ $\bar{q}$ = particle velocity = $\frac{d\bar{r}}{dt}$ $C = \frac{\sigma d^2}{18\mu}$ equation (1) may be written $$C \frac{d^2 \bar{r}}{dt^2} = \frac{f(Re)}{24} \left( \overline{q_F} - \frac{d\bar{r}}{dt} \right) + C\bar{g} \left( 1 - \frac{\rho}{\sigma} \right) + C \left( \frac{\rho}{\sigma} \right) \left( \frac{1}{\rho} \nabla p \right) \quad (2)$$

This equation is considered to be a good approximation for dilute systems of small particles of irregular shape. If the analysis is restricted to very small particles such that the flow of fluid relative to the particle is Stokesian, the drag force is then proportional to $d$, and therefore large compared with the gravitational and pressure gradient forces which are proportional to $d^3$. Equation (2) then simplifies to $$C \frac{d^2 \bar{r}}{dt^2} = \overline{q_F} - \frac{d\bar{r}}{dt} \quad (3)$$

To solve equation (3) it is convenient to select, from the cylindrical $(z, r, \theta)$ and spherical $(R, \phi, \theta)$ polar coordinate systems shown in FIG. 6, the components in the z, $\phi$, and $\theta$ directions. The relevant equations are then $$C \frac{d^2 z}{dt^2} = (q_F)_z - \frac{dz}{dt} \quad (4)$$

$$C \left[ \frac{d^2 \phi}{dt^2} + 2 \frac{dR}{dt} \frac{d\phi}{dt} - R \left( \frac{d\theta}{dt} \right)^2 \sin\phi \cos\phi \right] = (q_F)_\phi - R \frac{d\phi}{dt} \quad (5)$$

$$\frac{C}{r} \left[ \frac{d}{dt} \left( r^2 \frac{d\theta}{dt} \right) \right] = (q_F)_\theta - r \frac{d\theta}{dt} \quad (6)$$

Note that
$r = z \tan\phi = R \sin\phi$
and that $(q_F)_z$ is the component of the fluid velocity in the positive z direction and similarly for the other components.

4. Specification of fluid motion
In the sink-vortex flow $$\overline{q_r} = -\frac{aM}{R^2} + \frac{bK}{r} \qquad (7)$$

where $a$ and $b$ are unit vectors in the R and $\theta$ directions.

5. Solution of the equation of motion in sink-vortex flow

The method of solution depends on the fact that for very small particles the parameter C is much less than unity.

It is assumed that terms of $0(C^2)$ or higher can be neglected.

For equations (6) and (7)

$$C\left[\frac{d}{dt}\left(r^2\frac{d\theta}{dt}\right)\right] = K - r^2\frac{d\theta}{dt}$$

a linear equation in $r^2 (d\theta/dt)$ whose solution is $$r^2\frac{d\theta}{dt} = K + c_1 \exp(-t/C) \qquad (8)$$

If the particle is injected with a velocity equal to the fluid velocity then $c_1 = 0$. When C is small this condition is quickly reached whatever the initial particle velocity, and the particle continues to move through each point in its trajectory with this component of its velocity equal to that of the fluid at the same point:

$$r\frac{d\theta}{dt} = \frac{K}{r} \qquad (9)$$

From equations (4), (5), (7) and (9)

$$\frac{dz}{dt} = -\frac{M\cos^3\phi}{z^2} - C\frac{d^2z}{dt^2} \qquad (10)$$

$$R^2\frac{d\phi}{dt} = \frac{CK^2\cos\phi}{R^2\sin^3\phi} - C\left[\frac{d}{dt}\left(R^2\frac{d\phi}{dt}\right)\right] \qquad (11)$$

It is to be expected that small particles will diverge slowly from the fluid streamlines, so that it is likely that the second derivatives will be small compared with first derivatives. We therefore take as first approximations $$\frac{dz}{dt} = -\frac{M\cos^3\phi}{z^2}$$

$$R^2\frac{d\phi}{dt} = \frac{CK^2\cos^3\phi}{z^2\sin^3\phi}$$

from which, by differentiation, $$\frac{d^2z}{dt^2} = M\left[\frac{3CK^2\cos^7\phi}{z^6\sin^2\phi} - \frac{2M\cos^6\phi}{z^5}\right]$$

$$\frac{d}{dt}\left(R\frac{d\phi}{dt}\right) = CK^2\left[\frac{2M\cos^6\phi}{z^5\sin^3\phi} - \frac{3CK^2\cos^7\phi}{z^6\sin^7\phi}\right],$$

and hence by substituting back into equations (10) and (11) obtain the second approximations $$\frac{dz}{dt} = -\frac{M\cos^3\phi}{z^2} + \frac{2CM^2\cos^6\phi}{z^5} + O(C^2)$$

$$\frac{d\phi}{dt} = \frac{CK^2\cos^5\phi}{z^4\sin^3\phi} + O(C^2)$$

Finally, to $0(C)$ $$\frac{d\phi}{dz} = -\frac{CK^2\cos^2\phi}{M\, z^2\sin^3\phi} \qquad (12)$$

The same result obtains if the term in C is neglected from the approximation to $dz/dt$, from which it appears that the axial particle velocity is, for all practical purpose, equal to the axial component of the fluid velocity. Thus the particle only possesses a velocity relative to the fluid in the r direction.

Taking $$\frac{dz}{dt} = -\frac{M\cos^3\phi}{z^2}$$

$$\frac{d\phi}{dt} = \frac{CK^2\cos^5\phi}{z^4\sin^3\phi}$$

$$\frac{d}{dt}(z\tan\phi) = -\frac{M\sin\phi}{R^2} + \frac{CK^2}{r^3}$$

hence, $$(q_F)_r - \frac{dr}{dt} = -\frac{CK^2}{r^3}. \qquad (13)$$

Thus, the separating effect is entirely due to the vortex flow.

Integration of equation (12) gives $$\sec\phi + \cos\phi = \frac{CK^2}{Mz} + c_2$$

Choosing now the particle path which originates at the inner cone $\phi = \phi_0$ in the plane $z = z_0$, $$\sec\phi + \cos\phi = \frac{CK^2}{M}\left(\frac{1}{z} - \frac{1}{z_0}\right) + \sec\phi_0 + \cos\phi_0 \qquad (14)$$

or $$\cos^2\phi - \left(\frac{CK^2}{M}\left(\frac{1}{z} - \frac{1}{z_0}\right) + \sec\phi_0 + \cos\phi_0\right)\cos\phi + 1 = 0 \qquad (15)$$

The appropriate solution is $$\cos\phi = \frac{1}{2}\left(\frac{CK^2}{M}\left(\frac{1}{z}-\frac{1}{z_0}\right)+\sec\phi_0+\cos\phi_0\right)$$

$$-\left\{\frac{1}{4}\left(\frac{CK^2}{M}\left(\frac{1}{z}-\frac{1}{z_0}\right)+\sec\phi_0+\cos\phi_0\right)^2-1\right\}^{1/2} \quad (16)$$

6. Design equation for a sink-vortex separator

Equation (14) will be valid for very small particles only, but if it is applied for some specified value of C, corresponding to the smallest particles required to be separate it can be used to derive the fraction of the flow free of these and all larger particles, as the latter will have experienced a greater lateral movement.

FIG. 6, is a conceptual sketch of the sink-vortex separator.

The total volume flow is $$Q = \int_{z_0 \tan\phi_0}^{z_0 \tan\phi_1} w \, 2\pi r \, dr$$

where, since the velocity potential $$\phi = \frac{M}{(z^2+r^2)^{1/2}},$$

the vertical velocity is $$w = \frac{\delta\phi}{\delta z} = -\frac{Mz}{(z^2+r^2)^{3/2}},$$

hence $$Q = 2\pi M (\cos\phi_0 - \cos\phi_1) \quad (17)$$

Consider a particle which traverses the flow from $\phi_0$ to $\phi$ between $z_0$ and $z_1$. Then the volume flow $2\pi M (\cos\phi_0 - \cos\phi)$ contains only particles smaller than this particle in the plane $z = z_1$. Therefore, if the separation between $z_0$ and $z_1$ with respect to a particular size of particles is defined as the fraction of volume flow completely clear of those particles, $$S = \frac{\cos\phi_0 - \cos\phi}{\cos\phi_0 - \cos\phi_1} \quad (18)$$

From equations (16), (17) and (18)

$$S = \frac{\cos\phi_0 - X + \sqrt{X^2-1}}{\cos\phi_0 - \cos\phi_1} \quad (19)$$

where $X = \frac{1}{2}\left(\frac{CK^2}{M}\left(\frac{1}{z_1}-\frac{1}{z_0}\right)+\sec\phi_0+\cos\phi_0\right)$ The expression $\sqrt{X^2-1}$ in equation (19) simplifies to $$\frac{1}{2}\left(\frac{2CK^2}{M}\left(\frac{1}{z_1}-\frac{1}{z_0}\right)(\sec\phi_0+\cos\phi_0)+(\sec\phi_0-\cos\phi_0)^2\right)^{1/2}$$

when the term in $C^2$ is neglected. If $$(\sec\phi_0 - \cos\phi_0)^2 >> \frac{2CK}{M}\left(\frac{1}{z_1}-\frac{1}{z_0}\right)(\sec\phi_0+\cos\phi_0)$$

further simplifications by expansion and truncation yields $$\cos\phi = \cos\phi_0 - \frac{CK^2}{M}\left(\frac{1}{z_1}-\frac{1}{z_0}\right)\cot^2\phi_0$$

and finally $$S = \frac{2\pi CK^2}{Q}\left(\frac{1}{z_1}-\frac{1}{z_0}\right)\cot^2\phi_0 \quad (20)$$

Theory of inlet design

Figures 7, 8:
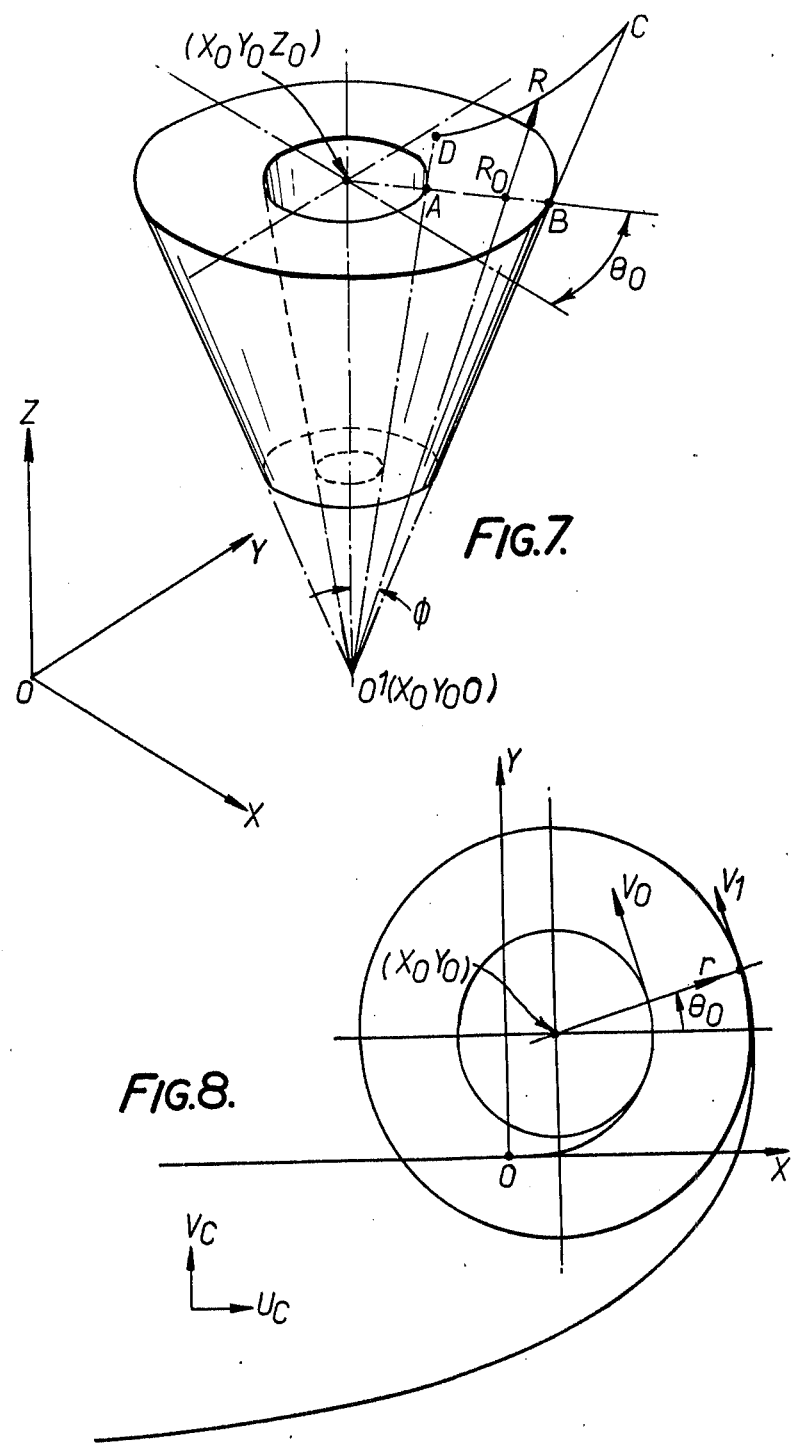
FIG. 7 is a further sketch showing coordinates and parameters considered in the mathematical analysis.
FIG. 8 is a sketch showing coordinates and parameters considered in the design of the inlet.

The conical section of a conical vortex separator is shown in FIG. 7. Streamlines of the sink-vortex flow are defined by -

$$\frac{dR}{(M/R^2)} = \frac{Rd\phi}{(O)} = \frac{R\sin\phi d\theta}{(K/R\sin\phi)}$$

from which $\phi$ = constant, that is, streamlines lie on the surfaces of cones with apices at the origin $0'$, and $$R - R_0 = -M\sin\phi(\theta-\theta_0)/K$$

The top surface of the separator is defined by tracing back through a full revolution $\theta = -2\pi$ streamlines which intersect the radius $\theta = \theta_0$. ABCD is then the cross-section required of an inlet to the sink-vortex flow. Ducting upstream is to be so shaped as to produce at this section the three-dimensional velocity distribution appropriate to the sink-vortex flow.

The velocity field of a two-dimensional vortex flow can be produced from a curved, contracting flow designed by the Helmholtz-Kirchhoff method of potential flow analysis. The bounding streamlines of the resultant flow are shown in FIG. 8. On the continuously-curved outer streamline the flow speed is constant and equal to $V_1$; on the inner streamline the speed increases from $V_1$ to $V_0$ along the straight section between $(-\infty, o)$ and $(o, o)$ and there is thereafter constant. By so specifying the speed on the inner boundary a smoothly curved shape is obtained with the angle of the surface increasing continuously with distance along it.

The two-dimensional flow in FIG. 8 is scaled to correspond with the section of the separator in the xy plane $z = z_0$ of FIG. 8, that is, $r = z_0\tan\phi$, $V(r) = K/z_0\tan\phi$. The radius $\theta = \theta_0$ is chosen such that the streamlines crossing it are, to a sufficient approximation, circular.

It remains to add to the velocity at each point in the two-dimensional flow, denoted by its x and y components $u_c(x, y)$ and $v_c(x, y)$, the sink velocity $M/R^2$ at that point. The x, y and z components of the velocity at the point $(x, y, z)$ in the inlet duct are then $$u = u_c - M(x-x_0)/R^3$$

$$v = v_c - M(y-y_0)/R^3$$

$$w = -M(z - z_0)/R^3$$

where $$R^2 = (x - x_0)^2 + (y - y_0)^2 + (z - z_0)^2$$

The streamlines are defined by $$\frac{dx}{ds} = -\frac{u}{q}$$

$$\frac{dy}{ds} = -\frac{v}{q}$$

$$\frac{dz}{ds} = -\frac{w}{q}$$

where $$ds^2 = d_x^2 + dy^2 + dz^2$$

$$q^2 = u^2 + v^2 + w^2$$

The streamline through any point in the section ABCD in FIG. 7 is traced back by a marching integration procedure sufficiently far to define a point in essentially parallel, uniform flow. The process is repeated for a number of starting points on the boundary ABCD to define the duct shape.

Expressing the above three steamline equations in Cartesian vector notation and integrating to develop the shape of the inlet leads to:

$$\underline{r} - \underline{r}_p = i(x - x_p) + j(y - y_p) + K(z - z_p)$$

$$= \int_0^s (\underline{q}/q) ds \qquad (A)$$

where $$\underline{q} = i[+\circledR\{\zeta^{1/2} + (\zeta+1)^{1/2}\}^{-(2IlnU)/\pi} - M(x - x_0)/(4\pi R^3)]$$
$$+ j[-\textcircled{I}\{\zeta^{1/2} + (\zeta+1)^{1/2}\}^{-(2IlnU)/\pi} - M(y - y_0)/(4\pi R^3)]$$
$$+ K[-M(z - z_0)/(4\pi R^3)] \qquad (B)$$

where $I$ signifies $-(-1)^{1/2}$ $\circledR$ signifies — "the real part of"

$\textcircled{I}$ signifies — "the imaginary part of"

$$R = \{(x - x_0)^2 + (y - y_0)^2 + (z - z_0)^2\}^{1/2} \qquad (C)$$

The complex variable centering into the expression for $q$ is determined by carrying out, in parallel with the numerical integration giving $r$, the following numerical integration:

$$\zeta = \zeta_0 + \pi \int_0^s \frac{\zeta}{q} \{\zeta^{1/2} + (\zeta+1)^{1/2} \,^{-(2IlnU)/\pi}[\{\overline{\zeta}^{1/2} + (\overline{\zeta}+1)^{1/2}\}^{(2IlnU)/\pi}] ds$$
$$- M\{(x - x_0) + I(y - y_0)\}/(4\pi R^3)] ds \qquad (D)$$

where ⁻ signifies — "the complex conjugate of"

Initial values are determined by first carrying out the numerical integrations after setting $M = \underline{r}_p = 0$, with U equal to the required velocity ratio between the inner and outer walls of the separator and $\zeta_0 = -1$. Integrating with respect to the variable $s$, first in the positive and then in the negative sense (taking due account of the unit jump in the value of $y$ at $\zeta - o$), gives the inlet shape in the absence of the flow induced by the three-dimensional sink at $(x_0, y_0, z_0)$. The streamlines will tend to become circular as $\zeta \to \pm\infty$ and the centre of these circles is used to define $(x_0, y_0)$. The vertical coordinate $z_0$ is chosen so that the inlet is located at any convenient position along this axis. For example, $z_0$ may be chosen to be 0.

The magnitude of M is chosen to give the required helix angle on the walls of the separator, using the fact that the tangential component of velocity is unity on the outer wall and U on the inner wall of the two-dimensional inlet obtained in the previous step.

Suitable starting points for streamlines defining the walls of the three-dimensional inlet are obtained by interpolation on the two-dimensional inlet, developed by the integrations defined above, at a section where the walls have become sufficiently circular. This defines $(x_p, y_p)$ and $z_p$ values are selected to produce any required upper surface shape to the inlet.

The use of a uniform velocity of translation parallel to the vortex axis rather than that appropriate to a sink simplifies the calculations, in particular leading to a cylindrical rather than conical separator. In this case the calculated $(x,y)$ coordinates of streamlines in the two-dimensional contracting flow are preserved in corresponding streamlines in the three dimensional inlet duct, so that it is only necessary to calculate the progressive increase in $z$ of streamlines traced back from their intersection with the radius $\theta = \theta_0$ in the $xy$ plane $z = z_0$. The $z$ dimension of the duct between corresponding streamlines in its upper and lower surfaces remains constant. In a conical vortex separator in which the cone angles are small it may be sufficient to use a cylindrical inlet, designed with $w$ equal to $w_0$, the average velocity in the $xy$ plane $z = z_0$.

The inlet to the cylindrical separator can be developed from the same equations by allowing the sink to become infinitely remote in a direction parallel to the z axis (i.e. $z_0$ tends to $-\infty$). This results in equations (B) and (D) becoming:

$$\underline{q} = i[+\circledR \{\zeta^{1/2} + (\zeta + 1)\}^{1/2-(2IlnU)/\pi} + j[-\textcircled{I}\{\zeta^{1/2} +$$
$$(\zeta + 1)\}^{1/2-(2IlnU)/\pi} + kw_0 \qquad (B')$$

$$\zeta = \zeta_0 + \pi \int_0^s \frac{\zeta}{q} \{\zeta^{1/2} + (\zeta + 1)^{1/2}\}^{-(2IlnU)/\pi} [\{\overline{\zeta}^{-1/2} +$$
$$(\overline{\zeta} + 1)^{1/2}\}^{(2IlnU)/\pi}] ds \qquad (D')$$

We claim:

1. Apparatus for separating particles from a stream of gas and entrained particles comprising, an elongate annular duct having an outer tubular wall and an inner tubular wall both extending from an inlet end of the duct through to an outlet end of the duct;

an annular duct roof on the inlet end of the duct;

an inlet to the duct to direct said stream into the inlet end of the duct so that it flows with swirling motion through to the outlet end of the duct; and outlet means to divide an inner part of the flow at the outlet end of the duct from particles in the outer region of the flow; wherein said inlet has a roof, a floor and inner and outer walls connecting the roof and floor so as to define a single inlet passage separate from the annular duct; and wherein the inner and outer walls of the inlet converge in the direction of flow and smoothly join the inner and outer walls of the duct respectively;

the roof of the inlet joins smoothly on to the roof of the duct;

the floor of the inlet and the smoothly continuous inlet and duct roofs become continuously less transverse to the axis of the duct in the direction of flow;

the roof of the duct, after one revolution around the duct, joins smoothly with the floor of the inlet at the entrance to the annular duct; and the inlet is of contracting cross-section in the direction of flow.

2. Apparatus as claimed in claim 1, wherein the inner and outer walls of the duct both converge conically toward a common convergence apex beyond the outlet end of the duct so that the duct is of contracting annular cross-section toward its outlet end.

3. Apparatus as claimed in claim 1, wherein the inner and outer walls of the inlet are for all cross-sections taken radially of the duct substantially parallel with the duct axis.

4. Apparatus as claimed in claim 1, wherein the floor of the inlet is, for all cross-sections through the inlet taken radially of the duct, less transverse to the duct axis than the roof of the inlet.

5. Apparatus for separating particles from a stream of gas and entrained particles comprising;

an elongate annular duct having an outer tubular wall and an inner tubular wall both extending from an inlet end of the duct through to an outlet end of the duct;

an annular duct roof on the inlet end of the duct;

an inlet to the duct to direct said stream into the inlet end of the duct so that it flows with swirling motion through to the outlet end of the duct; and outlet means to divide an inner part of the flow at the outlet end of the duct from particles in the outer region of the flow; wherein said inlet has a roof, a floor and inner and outer walls connecting the roof and floor so as to define a single inlet passage separate from the annular duct; and wherein for all transverse cross-sections through the inlet taken radially of the duct the inner and outer walls of the inlet are substantially parallel with the axis of the duct, the outer wall is longer than the inner wall in the direction parallel to the duct axis so that the roof and floor of the inlet are mutually inclined and the floor of the inlet is less transverse to the duct axis than the roof of the inlet;

the roof of the inlet joins smoothly onto the roof of the duct;

the floor of the inlet and the smoothly continuous inlet and duct roofs become continuously less transverse to the axis of the duct in the direction of flow;

the roof of the duct, after one revolution around the duct, joins smoothly with the floor of the inlet at the entrance to the duct; and the inlet is of contracting cross-section in the direction of flow.

6. Apparatus as claimed in claim 5, wherein the inner and outer walls of the duct both converge conically toward a common convergence apex beyond the outlet end of the duct so that the duct is a contracting annular cross-section toward its outlet end.

7. Fuel delivery means for a furnace fired by gas borne particulate fuel, including an apparatus for separating particles from a stream of gas and entrained particles, said apparatus comprising, an elongate annular duct having an outer tubular wall and an inner tubular wall both extending from an inlet end of the duct through to an outlet end of the duct;

an annular duct roof on the inlet end of the duct;

an inlet to the duct to direct said stream into the inlet end of the duct so that it flows with swirling motion through to the outlet end of the duct; and outlet means to divide an inner part of the flow at the outlet end of the duct from particles in the outer region of the flow; wherein said inlet has a roof, a floor and inner and outer walls connecting the roof and floor so as to define a single inlet passage separate from the annular duct; and wherein the inner and outer walls of the inlet converge in the direction of flow and smoothly join the inner and outer walls of the duct respectively;

the roof of the inlet joins smoothly onto the roof of the duct;

the floor of the inlet and the smoothly continuous inlet and duct roofs become continuously less transverse to the axis of the duct in the direction of flow;

the roof of the duct, after one revolution around the duct, joins smoothly with the floor of the inlet at the entrance to the annular duct; and the inlet is of contracting cross-section in the direction of flow; and wherein said outlet means comprises passage means having an annular inlet presented to the inner part of the flow at the exit annulus of the duct which passage means extends from its inlet back through the space within the inner wall of the annular duct to the inlet end of the duct;

said apparatus being mounted exteriorly of the furnace wall with said annular duct transverse to the wall said outlet end of the duct disposed within an opening through the furnace wall such that said particles in the outer regions of the flow at the outlet end of the duct pass into the furnace via said opening with swirl from the duct.

8. Fuel delivery means for a furnace fired by gas borne particulate material, including an apparatus for separating particles from a stream of gas and entrained particles, said apparatus comprising, an elongate annular duct having an outer tubular wall and an inner tubular wall both extending from an inlet end of the duct through to an outlet end of the duct;

an annular duct roof on the inlet end of the duct;

an inlet to the duct to direct said stream into the inlet end of the duct so that it flows with swirling motion through to the outlet end of the duct; and outlet means to divide an inner part of the flow at the outlet end of the duct from particles in the outer region of the flow; wherein said inlet has a roof, a floor and inner and outer walls connecting the roof and floor so as to define a single inlet passage separate from the annular duct; and wherein for all transverse cross-sections through the inlet taken radially of the duct the inner and outer walls of the inlet are substantially parallel with the axis of the duct, the outer wall is longer than the inner wall in the direction parallel to the duct axis so that the roof and floor of the inlet are mutually inclined and the floor of the inlet is less transverse to the duct axis than the roof of the inlet;

the roof of the inlet joins smoothly onto the roof of the duct;

the floor of the inlet and the smoothly continuous inlet and duct roofs become continuously less transverse to the axis of the duct in the direction of flow;

the roof of the duct, after one revolution around the duct, joins smoothly with the floor of the inlet at the entrance to the duct; and the inlet is of contracting cross-section in the direction of flow; and wherein said outlet means comprises passage means having an annular inlet presented to the inner part of the flow at the exit annulus of the duct which passage means extends from its inlet back through the space within the inner wall of the annular duct to the inlet end of the duct;

said apparatus being mounted exteriorly of the furnace wall with said annular duct transverse to the wall and said outlet end of the duct disposed within an opening through the furnace wall such that said particles in the outer regions of the flow at the outlet end of the duct pass into the furnace via said opening with swirl from the duct.

* * * * *

UNITED STATES PATENT OFFICE
CERTIFICATE OF CORRECTION

Patent No. 4,011,068                  Dated March 8, 1977

Inventor(s) Richard Penderell Llewelyn et al.

It is certified that error appears in the above-identified patent and that said Letters Patent are hereby corrected as shown below:

On the cover sheet, in the intem (*) Notice:

"May 3, 1992" should read -- May 13, 1992 --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*